United States Patent
Matsui et al.

(10) Patent No.: US 8,478,474 B2
(45) Date of Patent: Jul. 2, 2013

(54) DIAGNOSTIC APPARATUS AND DIAGNOSTIC METHOD FOR BELT SQUEEZING FORCE ADJUSTING MECHANISM

(75) Inventors: Yasunari Matsui, Okazaki (JP); Akira Hino, Toyota (JP); Shinya Toyoda, Nissin (JP); Naoto Tanaka, Okazaki (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 814 days.

(21) Appl. No.: 12/362,855

(22) Filed: Jan. 30, 2009

(65) Prior Publication Data

US 2009/0204285 A1    Aug. 13, 2009

(30) Foreign Application Priority Data

Feb. 13, 2008  (JP) ................. 2008-032300

(51) Int. Cl.
  *G01M 17/00*  (2006.01)
  *G06F 7/00*   (2006.01)
  *F16H 61/00*  (2006.01)
  *B60W 10/04*  (2006.01)

(52) U.S. Cl.
  USPC ......... 701/29.1; 701/29.2; 701/61; 477/45; 477/110; 477/111

(58) Field of Classification Search
  USPC ............. 701/29, 61, 29.1, 29.2; 477/45, 110, 477/111
  See application file for complete search history.

(56) References Cited

U.S. PATENT DOCUMENTS

| 4,462,277 A | * | 7/1984 | Miki et al. ............. 477/45 |
| 4,476,746 A | * | 10/1984 | Miki et al. ............ 477/45 |
| 4,534,243 A | * | 8/1985 | Yokoyama et al. ....... 477/49 |

(Continued)

FOREIGN PATENT DOCUMENTS

| DE | 199 37 472 C1 | 11/2000 |
| JP | 60-157553 A | 8/1985 |

(Continued)

OTHER PUBLICATIONS

Japanese Office Action dated Dec. 8, 2009 for corresponding Japanese Application No. 2008-032300.

(Continued)

*Primary Examiner* — James Trammell
*Assistant Examiner* — Majdi Alsomiri
(74) *Attorney, Agent, or Firm* — Sughrue Mion, PLLC

(57) ABSTRACT

A diagnostic apparatus and a diagnostic method are provided for a belt squeezing force adjusting mechanism of a continuously variable transmission in which a belt is wound around a primary sheave that receives driving force and a secondary sheave that outputs force to a drive line, and which continuously changes the output rotation speed by adjusting the width of the groove the primary sheave and the secondary sheave by shift control. This diagnostic determines, as a precondition, whether a target control value calculated in shift control is in a low region, and performs a diagnostic on the belt squeezing force adjusting mechanism based on the relationship between an actual control value and the target control value during control to reduce a control value when it is determined that the precondition is satisfied. According to this diagnostic apparatus and diagnostic method, an erroneous diagnosis can be prevented so the diagnostic can be performed accurately.

14 Claims, 7 Drawing Sheets

U.S. PATENT DOCUMENTS

| | | | |
|---|---|---|---|
| 4,698,764 A | | 10/1987 | Inagaki et al. |
| 4,785,690 A | * | 11/1988 | Yokoyama et al. ............. 477/45 |
| 4,967,621 A | * | 11/1990 | Soga et al. ...................... 477/49 |
| 5,720,692 A | * | 2/1998 | Kashiwabara .................. 477/45 |
| 7,192,383 B2 | * | 3/2007 | Shimada et al. ................ 477/45 |
| 7,774,120 B2 | * | 8/2010 | Yamaguchi et al. ............ 701/61 |
| 2002/0155910 A1 | * | 10/2002 | Nishizawa et al. ............. 474/69 |
| 2007/0099754 A1 | * | 5/2007 | Yamaguchi et al. ............ 477/44 |
| 2007/0232424 A1 | | 10/2007 | Nishida |
| 2008/0004153 A1 | * | 1/2008 | Reuschel ...................... 475/254 |

FOREIGN PATENT DOCUMENTS

| | | |
|---|---|---|
| JP | 08-127261 A | 5/1996 |
| JP | 11-280886 A | 10/1999 |
| JP | 2004 316861 A | 11/2004 |
| JP | 2006-248371 A | 9/2006 |
| JP | 2007-002955 A | 1/2007 |

OTHER PUBLICATIONS

Eurpoean Search Report issued Dec. 23, 2011 for European Application No. 09152649.1.

\* cited by examiner

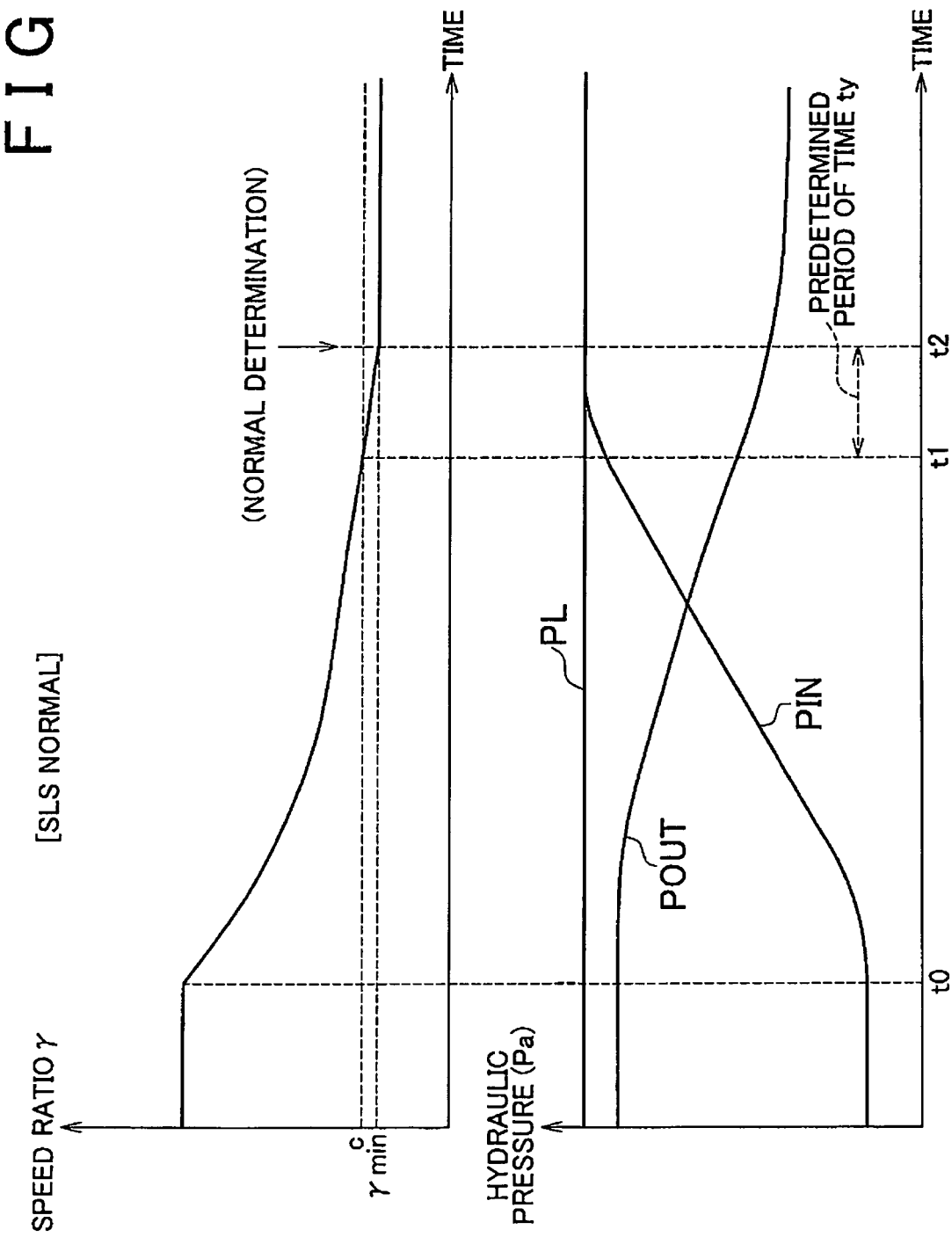

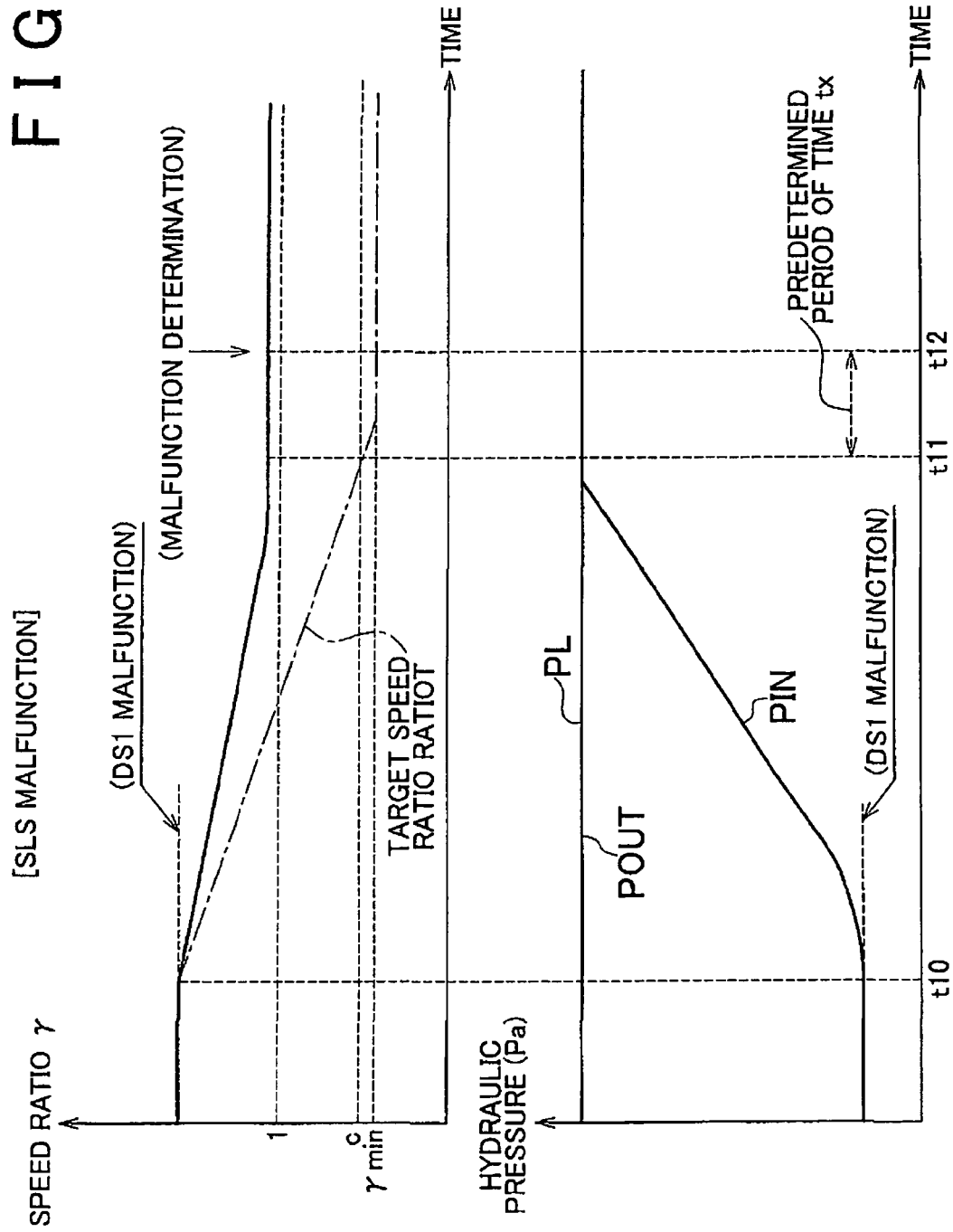

DIAGNOSTIC APPARATUS AND DIAGNOSTIC METHOD FOR BELT SQUEEZING FORCE ADJUSTING MECHANISM

INCORPORATION BY REFERENCE

The disclosure of Japanese Patent Application No. 2008-032300 filed on Feb. 13, 2008, including the specification, drawings and abstract is incorporated herein by reference in its entirety.

BACKGROUND OF THE INVENTION

1. Field of the Invention

The invention relates to a diagnostic apparatus and diagnostic method for a belt squeezing force adjusting mechanism in a continuously variable transmission in which a belt is wound around a primary sheave that receives driving force and a secondary sheave that outputs force to a drive-line, and which continuously (i.e., in a non-stepped manner) changes the output rotation speed by adjusting the width of the groove of the primary sheave and the secondary sheave by shift control.

2. Description of the Related Art

Japanese Patent Application Publication No. 60-157553 (JP-A-60-157553) and Japanese Patent Application Publication No. 2006-248371 (JP-A-2006-248371), for example, describe apparatuses for diagnosing a malfunction in a continuously variable transmission. Because it is important that electromagnetic valves used to adjust the position of a primary sheave function properly in order to control the speed ratio of the continuously variable transmission, the technology described in JP-A-60-157553 diagnoses a malfunction in two electromagnetic valves in a shift adjusting apparatus that adjusts the position of the primary sheave. Similarly, the technology described in JP-A-2006-248371 diagnoses whether a duty solenoid used to adjust the position of the primary sheave is disconnected.

Moreover, in a continuously variable transmission, the squeezing force is adjusted by a belt squeezing force adjusting mechanism so that the belt will not slip on the sheave. A diagnostic must be performed on this belt squeezing force adjusting mechanism to keep the continuously variable transmission functioning properly.

That is, if the belt squeezing force adjusting mechanism is not functioning properly due to a solenoid valve being disconnected or the like, and as a result, the belt is squeezed more than necessary, the continuously variable transmission may not be able to upshift sufficiently when the primary sheave side attempts to reduce the speed ratio, i.e., when the primary sheave side attempts an upshift, if the squeezing force on the secondary sheave side remains strong. Therefore, it is necessary to determine whether the belt squeezing force adjusting mechanism is functioning normally or is malfunctioning.

In JP-A-60-157553 and JP-A-2006-248371 described above, a diagnosis that an electromagnetic valve, which adjusts the speed ratio on the primary sheave side, is malfunctioning is made when the actual sheave position is unable to come close to a target sheave position when the electromagnetic valve is being controlled to perform upshift, i.e., when the actual speed ratio is unable to come close to a target speed ratio.

Because a malfunction in the belt squeezing force adjusting mechanism also makes it difficult to change the speed ratio, the diagnostic may be the same as it is in JP-A-60-157553 and JP-A-2006-248371. However, if the diagnostic is performed under the same conditions as those for determining a malfunction in the speed ratio adjustment on the primary sheave side in this way, speed ratio control may appear normal due to the fact that the primary sheave side is able to be adjusted, even though there may actually be a malfunction in the belt squeezing force adjusting mechanism. In this case, there may be an erroneous diagnosis that the belt squeezing force adjusting mechanism is functioning normally even though it is not.

SUMMARY OF THE INVENTION

In view of the foregoing problems, this invention thus provides a diagnostic apparatus and a diagnostic method for a belt squeezing force adjusting mechanism, which can accurately perform a diagnostic on a belt squeezing force adjusting mechanism.

A first aspect of the invention relates to a diagnostic apparatus for a belt squeezing force adjusting mechanism of a continuously variable transmission in which a belt is wound around a primary sheave that receives driving force and a secondary sheave that outputs force to a drive-line, and which continuously changes the output rotation speed by adjusting the width of the groove of the primary sheave and the secondary sheave by shift control. This diagnostic apparatus includes a precondition determining apparatus which determines, as a precondition, whether a target control value calculated in shift control is in a low region; and a diagnostic device which performs a diagnostic on the belt squeezing force adjusting mechanism based on the relationship between an actual control value and the target control value during control to reduce a control value when it is determined by the precondition determining apparatus that the precondition is satisfied.

Also, another aspect of the invention relates to a diagnostic method for a belt squeezing force adjusting mechanism of a continuously variable transmission in which a belt is wound around a primary sheave that receives driving force and a secondary sheave that outputs force to a drive-line, and which continuously changes the output rotation speed by adjusting the width of the groove of the primary sheave and the secondary sheave by shift control. This diagnostic method includes determining, as a precondition, whether a target control value calculated in shift control is in a low region; and performing a diagnostic on the belt squeezing force adjusting mechanism based on the relationship between an actual control value and the target control value during control to reduce a control value when it is determined that the precondition is satisfied.

In this case, the control value may be a speed ratio of the continuously variable transmission or a sheave position of the primary sheave of the continuously variable transmission. In shift control, for example, when the control value is a speed ratio and an attempt is being made to reduce the control value from the region where it is high, even if the belt squeezing force adjusting mechanism is malfunctioning, the control value can still be reduced within a certain range as long as the primary sheave position can be adjusted. Therefore, when control is being performed to set the target control value in a high region, the actual control value can be brought close to the target control value even if the belt squeezing force adjusting mechanism is malfunctioning. If a diagnostic were to be performed at this time, the result would be erroneous.

In this invention, a precondition for performing a diagnostic is that the target control value be in a low region. Therefore, a diagnostic is not performed on the belt squeezing force adjusting mechanism when the target control value is in the high region so an erroneous diagnosis that the belt squeezing force adjusting mechanism is functioning normally even though it is not will not be made.

When the target control value is in the low region, the diagnostic on the belt squeezing force adjusting mechanism is not affected by the adjustment of the primary sheave position so a determination as to whether the belt squeezing force adjusting mechanism is malfunctioning or functioning normally can be made accurately from the relationship of the target control value and the actual control value during control to reduce the control value. In this way, the diagnostic apparatus and diagnostic method for a belt squeezing force adjusting mechanism enables a diagnostic to be accurately performed on the belt squeezing force adjusting mechanism.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 6 is a timing chart illustrating one example of control when the solenoid valve SLS shown in FIG. 2 is functioning normally; and FIG. 7 is a timing chart illustrating one example of control when the solenoid valve SLS shown in FIG. 2 is malfunctioning.

DETAILED DESCRIPTION OF EMBODIMENTS

Figure 1:
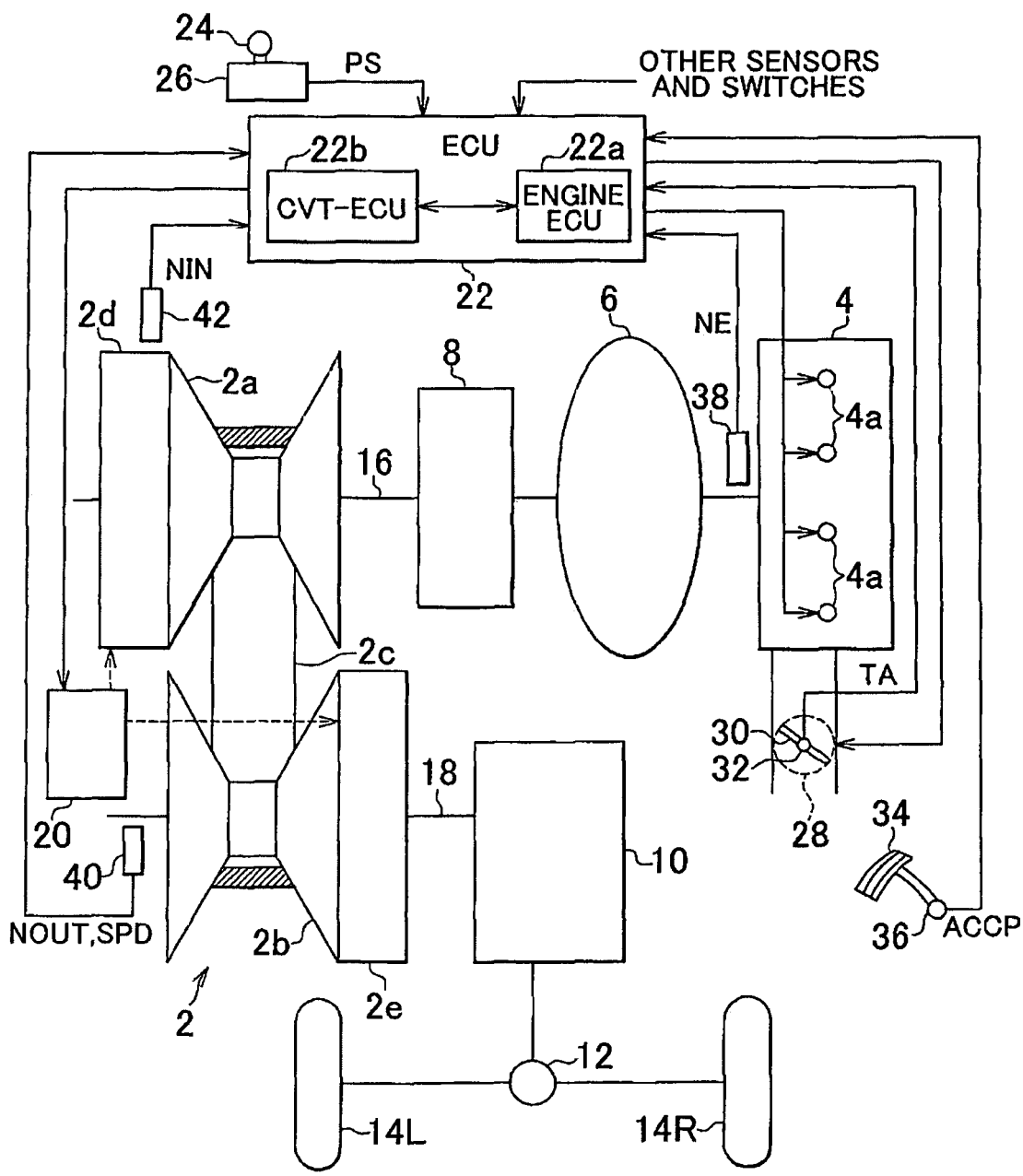
FIG. 1 is a block diagram showing a power transmission device using a CVT according to an example embodiment of the invention.

FIG. 1 is a block diagram showing a power transmission device that uses a belt type continuously variable transmission (hereinafter simply referred to as "CVT") 2 in a vehicle to which the invention has been applied. An internal combustion engine 4 is provided as the source for rotational driving force used for running. The internal combustion engine 4 may be a gasoline engine or a diesel engine or the like, but in this example embodiment, it is a gasoline engine (hereinafter simply referred to as "engine") 4.

Output from the engine 4 is transmitted from a torque converter 6 to a differential gear unit 12 via a forward-reverse switching apparatus 8, the CVT 2, and a reduction gear 10. The differential gear unit 12 then distributes that output to left and right driving wheels 14L and 14R. The CVT 2 includes a primary sheave 2a with a variable efficient radius that is provided on an input shaft 16, a secondary sheave 2b with a variable efficient radius that is provided on an output shaft 18, and a drive belt 2c that is wound around V-shaped grooves of the two sheaves 2a and 2b. This structure enables power to be transmitted via friction force between the drive belt 2c and the inside wall surfaces of the V-shaped grooves of the sheaves 2a and 2b. The sheave 2a is provided with an input side hydraulic cylinder 2d and the sheave 2b is provided with an output side hydraulic cylinder 2e. The input side hydraulic cylinder 2d and the input side hydraulic cylinder 2e are used to change the width of the V-shaped grooves, i.e., the winding radius of the drive belt 2c. With this structure, the winding radius (i.e., the effective radius) of the drive belt 2c around the two sheaves 2a and 2b can be changed by adjusting the amount of hydraulic fluid supplied to or discharged from the hydraulic cylinders 2d and 2e by a hydraulic control circuit 20, which enables the speed ratio $\gamma$ (=input shaft rotation speed NIN/output shaft rotation speed NOUT) to be continuously changed).

An electronic control unit (hereinafter simply referred to as "ECU") 22 which is formed centered around a microcomputer includes an engine ECU 22a that controls the engine 4, and a CVT-ECU 22b that controls the CVT 2. This ECU 22 receives an operating position PS signal from an operating position detecting sensor 26 that detects the operating position of a shift lever 24. The ECU 22 also receives a signal indicative of a throttle opening amount TA from a throttle sensor 32 that detects the opening amount of a throttle valve 30 that is driven by a throttle actuator 28, and a signal indicative of an accelerator operation amount ACCP from an accelerator operation amount sensor 36 that detects the operation amount of an accelerator pedal 34 (i.e., a signal that reflects the amount of output required by the driver). The ECU 22 also receives a signal indicative of the engine speed NE from an engine speed sensor 38, a signal indicative of the vehicle speed SPD from a vehicle speed sensor (which also serves as an output shaft rotation speed sensor that detects the rotation speed NOUT of the output shaft 18) 40, and a signal indicative of the input shaft rotation speed NIN from an input shaft rotation speed sensor 42 that detects the input shaft rotation speed of the input shaft 16.

In addition, the ECU 22 also receives signals from other sensors and switches. In this case, these include a signal indicative of the hydraulic fluid temperature within the CVT 2, a signal indicative of the belt squeezing force control pressure of the secondary sheave 2b, and a signal indicative of an ignition key being turned to the ON position from an ignition switch that is operated by the ignition key.

The engine ECU 22a and the CVT-ECU 22b in the ECU 22 each perform computations written in programs based on data communicated between ECUs, data stored in internal memory, and the detected data described above, and then output signals based on the calculation results. The engine ECU 22a performs output torque control of the engine 4 of the vehicle to obtain suitable acceleration feel and fuel efficiency, and the CVT-ECU 22b performs shift control of the CVT 2. In the output torque control by the engine ECU 22a, a target output torque TE of the engine 4 is determined from a pre-stored relationship, and the output torque of the engine 4 is controlled by adjusting the throttle opening amount TA to obtain that target output torque TE. In addition, the engine ECU 22a performs other control such as fuel injection control that adjusts the time (i.e., duration) for which fuel injection valves 4a are open in order to supply fuel necessary for combustion to each intake port or into each cylinder.

In the shift control by the CVT-ECU 22b, a target speed ratio RATIOT is determined from a pre-stored relationship and the sheave position of the primary sheave 2a is controlled by operating the hydraulic control circuit 20 so that the speed ratio $\gamma$ of the CVT 2 comes to match the target speed ratio RATIOT.

Figure 2:
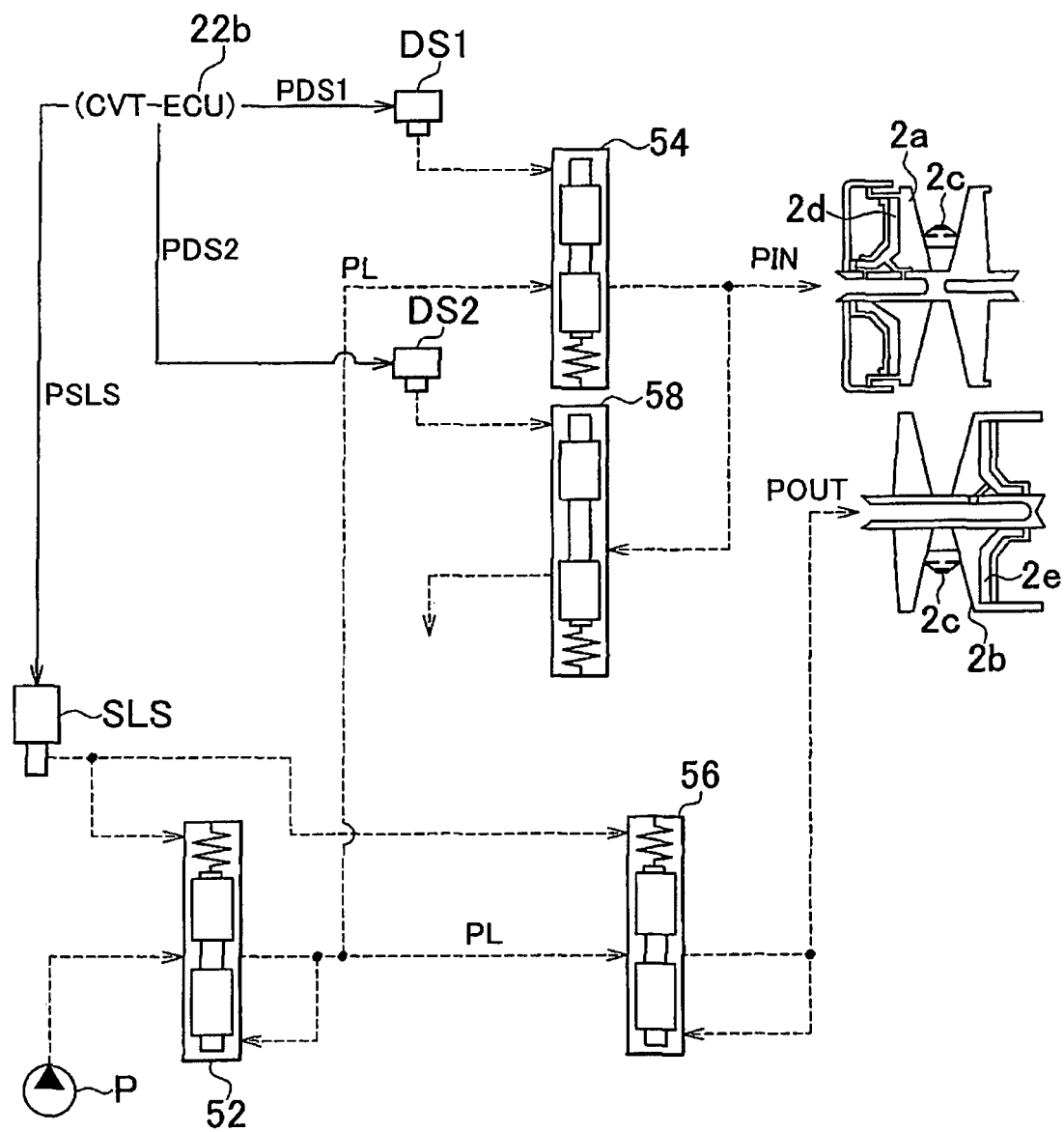
FIG. 2 is a diagram showing the main portions of a hydraulic control circuit of the CVT.

FIG. 2 shows the configuration of the main portions of the hydraulic control circuit 20. The CVT-ECU 22b controls the speed ratio of the CVT 2 by outputting a duty command to two duty solenoids DS1 and DS2 provided in the hydraulic control circuit 20. The hydraulic control circuit 20 receives a supply of hydraulic pressure from an oil pump P that is driven by the engine 4. Hydraulic pressure generated by the oil pump P is regulated by a line pressure valve 52 which is controlled by a solenoid valve SLS, and then it is supplied to an upshift valve 54 and a belt squeezing valve 56 as line pressure (base pressure) PL.

When the duty solenoid DS1 is driven, hydraulic pressure PIN is adjusted by the upshift valve 54 so that hydraulic fluid is supplied to the hydraulic cylinder 2d of the primary sheave 2a. This supply of hydraulic fluid causes the width of the groove of the primary sheave 2a to become narrower, and as it does so, the winding radius of the drive belt 2c changes resulting in an upshift.

On the other hand, when the duty solenoid DS2 is driven, the hydraulic pressure PIN is adjusted by a downshift valve 58 so that hydraulic fluid is discharged from the hydraulic pressure cylinder 2d of the primary sheave 2a. As a result, the width of the groove of the primary sheave 2a becomes wider, and as it does so, the winding radius of the drive belt 2c changes resulting in a downshift.

Figure 3:
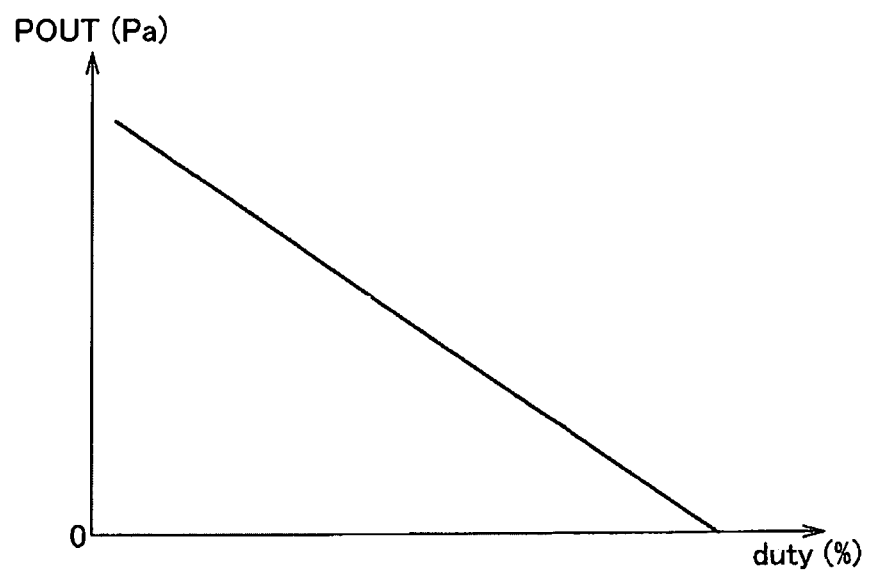
FIG. 3 is a graph showing the relationship between secondary sheave pressure POUT and control duty ratio of a solenoid valve SLS shown in FIG. 2.

Secondary sheave pressure POUT for gripping the drive belt 2c that is squeezed by the secondary sheave 2b is supplied to the hydraulic cylinder 2e of the secondary sheave 2b. This hydraulic pressure POUT is adjusted by controlling the solenoid valve SLS that switches the belt squeezing valve 56. More specifically, as the duty ratio (%) is decreased through duty control, the solenoid valve SLS opens such that a higher secondary sheave pressure POUT is supplied, as shown in FIG. 3. Conversely, as the duty ratio (%) is increased, the solenoid valve SLS closes such that a lower secondary sheave pressure POUT is supplied.

Figure 4:
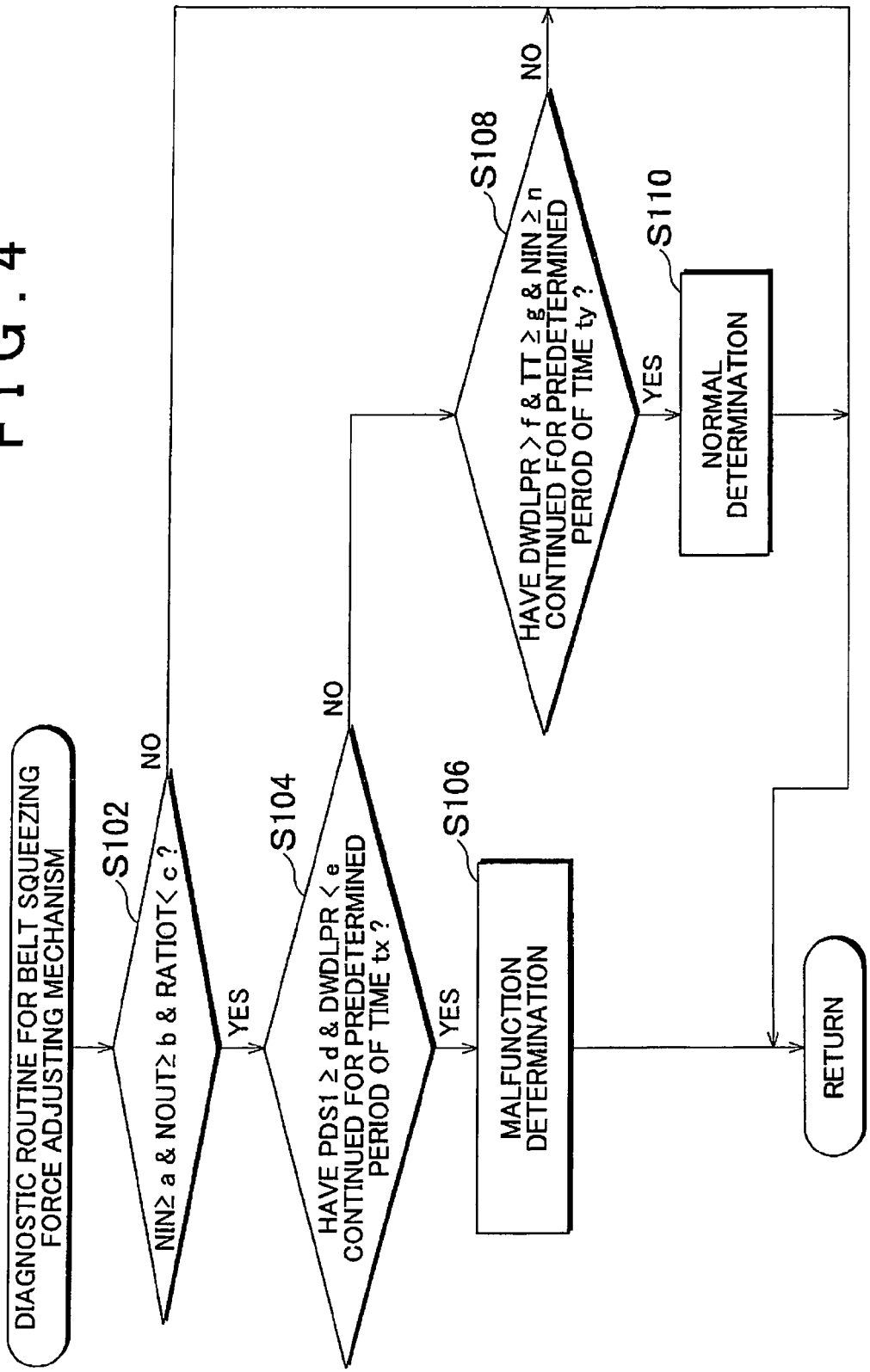
FIG. 4 is a flowchart illustrating a diagnostic routine for a belt squeezing force adjusting mechanism executed by a CVT-ECU shown in FIG. 1.

Here, a diagnostic routine of the diagnostic apparatus for the belt squeezing force adjusting mechanism which is executed by the CVT-ECU 22b will be described. FIG. 4 is a flowchart illustrating the diagnostic routine for the belt squeezing force adjusting mechanism. This routine is repeatedly executed at regular intervals of time. Incidentally, the term "step" in the flowchart corresponding to the individual processes will be abbreviated to the letter "S".

When the routine starts, it is first determined, as a precondition, whether the input shaft rotation speed NIN (rpm) is equal to or greater than a predetermined rotation speed a, whether the output shaft rotation speed NOUT (rpm) is equal to or greater than a predetermined rotation speed b, and whether the target speed ratio RATIOT is less than a predetermined speed ratio c (S102).

In this case, the predetermined speed ratio c is set to a value between 1 and the minimum speed ratio (0.42 in this case), inclusive. The range of speed ratios $\gamma$ able to be realized by the CVT 2 in this example embodiment is 0.42 to 2.4. The determination of whether the target speed ratio RATIOT is less than the predetermined speed ratio c corresponds to the determination of whether the target speed ratio RATIOT is in a low region. In this case, the predetermined speed ratio c is set to 0.5. That is, the predetermined speed ratio c is such that the low region of the target speed ratio includes the minimum speed ratio and speed ratios thereabound (i.e., from the minimum speed ratio to 0.5). Incidentally, in the CVT 2 in this example embodiment, the predetermined speed ratio c is 0.5, but the predetermined speed ratio c is set according to the type of the CVT 2 or the performance required for the vehicle.

If even one of the conditions, i.e., NIN≧a, NOUT≧b, and RATIOT<c is not satisfied (i.e., NO in S102), the precondition is not satisfied so this cycle of the routine ends. If, on the other hand, all of the conditions, i.e., NIN≧a, NOUT≧b, and RATIOT<c are satisfied (i.e., YES in S102), then it is determined whether a shift control amount PDS1 for the duty solenoid DS1 is equal to or greater than a predetermined value d and a difference DWDLPR between a target sheave position and the actual sheave position has continued to be less than a far range setting reference value e (a negative value) for a predetermined period of time tx (S104).

Figure 5:
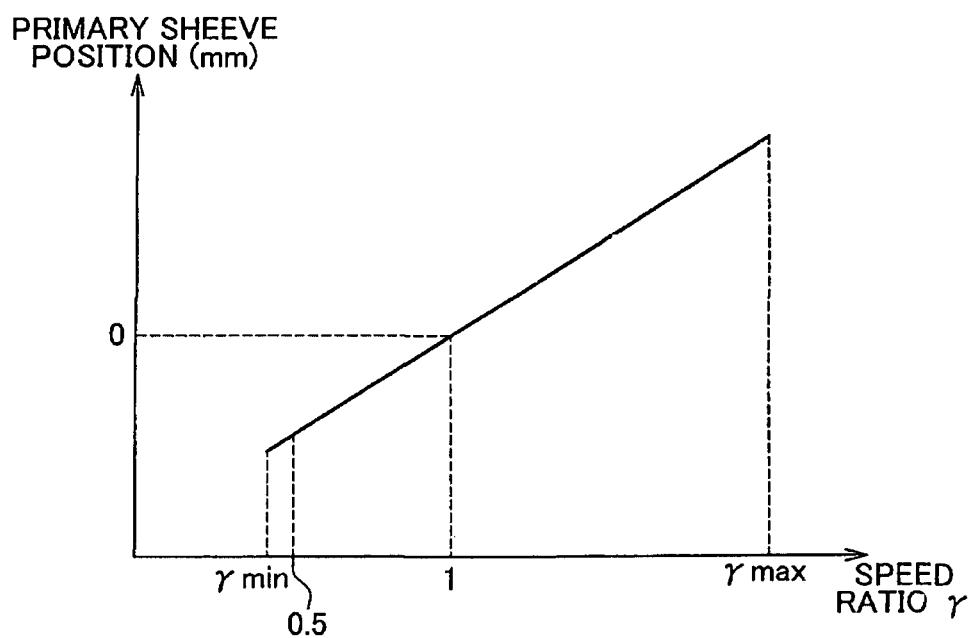
FIG. 5 is a graph showing the relationship between the speed ratio and the position of a primary sheave shown in FIG. 1.

When the shift control amount PDS1 is equal to or greater than d (i.e., PDS1≧d), it indicates a state in which control to narrow the width of the groove of the primary sheave 2a to reduce the speed ratio is attempting to be performed. The sheave position is obtained from the actual speed ratio $\gamma$ from a relationship such as that shown in FIG. 5. The difference DWDLPR is the difference between the target sheave position of the primary sheave 2a obtained based on the target speed ratio RATIOT and the actual sheave position obtained based on the actual speed ratio $\gamma$ calculated by dividing the input shaft rotation speed NIN by the output shaft rotation speed NOUT.

The far range setting reference value e represents the boundary of a far range which indicates that the actual speed ratio $\gamma$ is nowhere close to the target speed ratio RATIOT. When DWDLPR is less than e (i.e., DWDLPR<e), it indicates that the actual speed ratio $\gamma$ and the target speed ratio RATIOT are in the far range, i.e., it indicates that the actual speed ratio $\gamma$ is not close to the target speed ratio RATIOT.

Therefore, in step S104, it is determined whether an attempt is being made to reduce the actual speed ratio $\gamma$ from a state in which it is greater than the target speed ratio RATIOT by an actual duty command (i.e., the shift control amount PDS1) being output to the duty solenoid DS1 and a state in which the actual speed ratio $\gamma$ is still not near the target speed ratio RATIOT (i.e., DWDLPR<e) has continued for a predetermined period of time tx.

In this case, if the state in which PDS1≧1 and DWDLPR<e has continued for the predetermined period of time tx (i.e., YES in S104), it is determined that there is a malfunction (S106). That is, a diagnosis is made that the solenoid valve SLS which controls the squeezing force on the drive belt 2c is malfunctioning due to a disconnection or the like and is open.

If PDS1<d or DWDLPR≧e, or even if PDS1≧d and DWDLPR<e but this state has not continued for the predetermined period of time tx (i.e., NO in S104), then a condition for determining whether the solenoid valve SLS is functioning normally is determined (S108). That is, it is determined whether a state in which i) the difference DWDLPR between the target sheave position and the actual sheave position is greater than a close range setting reference value f (>e), ii) an input torque TT is equal to or greater than a reference torque g, and iii) the input shaft rotation speed NIN is equal to or greater than a reference rotation speed n (>a) has continued for a predetermined period of time ty. Incidentally, the input torque TT is the estimated input torque that is estimated from the operating state of the engine 4.

The close range setting reference value f represents the boundary of a close range which indicates that the actual speed ratio $\gamma$ is able to come close to the target speed ratio RATIOT. When DWDLPR is greater than f (i.e., DWDLPR>f), it indicates that the actual speed ratio $\gamma$ and the target speed ratio RATIOT are in the close range, i.e., are sufficiently close. When TT is equal to or greater than g (i.e., TT≧g) and NIN is equal to or greater than n (i.e., NIN≧n), it indicates that torque sufficient for accelerating is being applied to the CVT 2 and the rotation speed of the primary sheave 2a is increasing. When these conditions are satisfied, it is evident that the hydraulic control circuit 20 is reliably functioning normally.

Therefore, when the state in which DWDLPR>f, TT≧g, and NIN≧n has continued for a predetermined period of time ty (i.e., YES in S108), it is certain that the solenoid value is functioning normally so a normal determination is made (S110).

If DWDLPR≦f, TT<g, or NIN<n, or even if DWDLPR>f, TT≧g, and NIN≧n but this state has not continued for the predetermined period of time ty (i.e., NO in S108), it is uncertain whether the solenoid valve SLS is functioning normally so this cycle of the routine ends.

FIGS. 6 are 7 are timing charts illustrating examples of this control. FIG. 6 shows a case in which the solenoid valve SLS is functioning normally, and FIG. 7 shows a case in which the solenoid valve SLS is malfunctioning. In FIG. 6, from timing t0 the target speed ratio RATIOT is reduced until the minimum speed ratio γmin (<predetermined speed ratio c) is ultimately set. Therefore, the CVT-ECU 22b adjusts the actual sheave position so that the speed ratio γ comes close to the target speed ratio RATIOT by increasing the hydraulic pressure PIN by performing duty control (shift control amount PDS1≧d) on the duty solenoid DS1 so that the width of the groove of the primary sheave 2a becomes narrower.

The solenoid valve SLS is duty controlled to produce the secondary sheave pressure POUT calculated from the relationship between the change in speed ratio and the input torque of the primary sheave 2a in order to apply appropriate squeezing force on the drive belt 2c. In this case, the secondary sheave pressure POUT is gradually reduced because the width of the groove of the secondary sheave 2b increases.

Then as the hydraulic pressure PIN on the primary sheave 2a approaches the line pressure PL, the difference DWDLPR between the target sheave position and the actual sheave position becomes greater than f (t1). At this time, it will be assumed that the precondition in step S102 is already satisfied, and the input torque TT is equal to or greater than g, and the input shaft rotation speed NIN is equal to or greater than n. When this state continues for the predetermined period of time ty (t2), it a determination of normal is made (S110).

FIG. 7 is similar to FIG. 6 in that at timing t10 the target speed ratio RATIOT is reduced and the CVT-ECU 22b adjusts the actual sheave position so that the speed ratio γ comes close to the target speed ratio RATIOT by increasing the hydraulic pressure PIN by performing duty control (shift control amount PDS1≧d) on the duty solenoid DS1 so that the width of the groove of the primary sheave 2a becomes narrower. However, the solenoid valve SLS is not functioning due to a disconnection or the like so the secondary sheave pressure POUT remains the same as the line pressure PL and is unable to be reduced.

Therefore, the hydraulic pressure PIN for the primary sheave 2a reaches the line pressure PL (right before t11). However, because the secondary sheave pressure POUT is unable to be reduced due to the malfunction in the solenoid valve SLS, the width of the groove of the secondary sheave 2b is unable to be increased so the difference DWDLPR between the target sheave position and the actual sheave position does not become equal to or greater than the far range setting reference value e. That is, the actual sheave position remains very different from the target sheave position. Therefore, a malfunction is determined because the precondition is satisfied and the shift control amount PDS1 has continued to be equal to or greater than d (i.e., PDS1≧d) for the predetermined period of time tx (t12) (S106).

Incidentally, unlike the case in which the malfunction is in the solenoid valve SLS, if the malfunction is in the duty solenoid DS1, it is difficult to reduce the speed ratio γ from a high region (e.g., a region in which γ=1.5 or higher), as shown by the broken line, so a malfunction determination is made when the target speed ratio RATIOT is in the high region.

Therefore, the diagnostic of the solenoid valve SLS can be performed separately from the diagnostic of the duty solenoid DS1 by performing the diagnostic of the solenoid valve SLS only when the target speed ratio RATIOT is in the low region.

The first example embodiment described above yields the following effects. (i) The secondary sheave pressure POUT may not be able to be controlled due to a malfunction in the belt squeezing force adjusting mechanism caused by disconnection of the solenoid valve SLS or the like when an attempt is made to reduce the gear ratio γ by shift control. Even in this case, the speed ratio γ may decrease within a significant range if the primary sheave position is able to be adjusted by the duty solenoid DS1 in the primary sheave side adjusting mechanism. Therefore, when the target speed ratio RATIOT is to be controlled within a large range, the actual speed ratio γ can be brought close to the target speed ratio RATIOT even if there is a malfunction in the belt squeezing force adjusting mechanism, so if a diagnostic is performed in this state the result will be erroneous.

In this example embodiment, the precondition for performing a diagnostic on the belt squeezing force adjusting mechanism is that the target speed ratio RATIOT be in a low region, in this case, a region lower than a predetermined speed ratio c (S102). This region in which RATIOT<c is a region outside of the region that can be reached when there is a malfunction in the solenoid valve SLS, and is a region in which the speed ratio γ is low.

Therefore, in a high region where the target speed ratio RATIOT is equal to or greater than c (i.e., NO in S102), a diagnostic is not performed on the belt squeezing force adjusting mechanism, so an erroneous diagnosis that the solenoid valve SLS is functioning normally when in fact it is malfunctioning will not be made.

The region in which RATIOT<c (i.e., YES in S102) is a region of the speed ratio γ that is unable to be reached if the solenoid valve SLS is malfunctioning. Therefore, in this target speed ratio region, a malfunction determination will be made (S106) if the actual speed ratio γ has difficulty coming close to the target speed ratio RATIOT (YES in S104) when shift control is performing control to reduce the speed ratio γ.

Also, a normal determination will be made (S110) in a region in which RATIOT<c and the actual speed ratio γ is able to come close to the target speed ratio RATIOT (i.e., NO in S104 and YES in S108).

In this way, by performing a diagnostic when RATIOT is less than c but not performing a diagnostic on the belt squeezing force adjusting mechanism when RATIOT is equal to or greater than c in a region where the target speed ratio RATIOT is divided by the predetermined speed ratio c, an erroneous diagnosis can be prevented, thus enabling an accurate diagnostic to be performed on the belt squeezing force adjusting mechanism.

(ii) In this example embodiment, the region where the target speed ratio RATIOT is low is the region that is lower than the predetermined speed ratio c in which the speed ratio γ is set to a value between 1 and the minimum speed ratio. When there is a malfunction in the duty solenoid DS1, the actual speed ratio γ is only able to be adjusted from the maximum speed ratio to a value larger than one, such as approximately 1.5, for example. Therefore, the speed ratio region in which a diagnostic is able to be performed on the belt squeezing force adjusting mechanism is divided by setting the predetermined speed ratio c to a value between 1 and the minimum speed ratio. This enables a diagnostic to be performed accurately on the belt squeezing force adjusting mechanism.

(iii) A normal determination is made when the state in which the difference DWDLPR is greater than f, the input torque TT to the primary sheave $2a$ is equal to or greater than the reference torque g, and the input shaft rotation speed NIN (i.e., the rotation speed of the primary sheave) is equal to or greater than the reference rotation speed n continues for the predetermined period of time ty (S108).

The conditions of the input torque TT and the input shaft rotation speed NIN make it easy to identify when an upshift during acceleration is to be performed, so the diagnostic of the belt squeezing force adjusting mechanism can be performed with even greater accuracy.

(iv) For the precondition (S102), the condition that the input shaft rotation speed NIN be equal to or greater than a predetermined rotation speed a and the output shaft rotation speed NOUT be equal to or greater than a predetermined rotation speed b are added as an AND condition to RATIOT<c. As a result, a diagnostic can be performed using a rotation speed range where there is no error in detecting the speed ratio γ. Therefore, a diagnostic can be performed more accurately on the belt squeezing force adjusting mechanism.

Other Example Embodiments (a). In the example embodiment described above, an example is given in which the predetermined speed ratio c is set to 0.5. Alternatively, however, the predetermined speed ratio c can be set to any value between 1 and the minimum speed ratio γmin as described above in the first example embodiment, so c may be set to 1 or the minimum speed ratio γmin, for example.

(b). The actual sheave position is obtained from the actual speed ratio γ from a relationship such as that shown in FIG. 5. Alternatively, however, a sheave position sensor may be directly provided and the actual sheave position may be obtained using the actual measurement that is directly obtained. Also, the difference DWDLPR between the target sheave position and the actual sheave position is determined. Instead, however, the difference between the actual speed ratio γ and the target speed ratio RATIOT may be used in the determination.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are example, other combinations and configurations, including more, less or only a single elements, are also within the scope of the invention.

What is claimed is:

1. A diagnostic apparatus for a belt squeezing force adjusting mechanism of a continuously variable transmission in which a belt is wound around a primary sheave that receives driving force and a secondary sheave that outputs force to a drive-line, and which continuously changes the output rotation speed by adjusting the width of the groove of the primary sheave and the secondary sheave by shift control of controlling an actual control value responding to a target control value, comprising:
an electronic control unit, configured with executable program logic, to perform:
determining, as a precondition, whether a target control value calculated in shift control is in a lower region than a region of the control value that can be reached when the belt squeezing force adjusting mechanism is malfunctioning; and
performing, when it has been determined that the precondition is satisfied, a diagnostic on the belt squeezing force adjusting mechanism based on the relationship between the actual control value and the target control value when the control value is reducing due to the shift control,
wherein the ECU determines that there is a malfunction in the belt squeezing force adjusting mechanism when the actual control value has difficulty coming close to the target control value during the control to reduce the control value, and
wherein the ECU determines that the belt squeezing force adjusting mechanism is functioning normally when the actual control value is able to come close to the target control value.

2. The diagnostic apparatus for the belt squeezing force adjusting mechanism according to claim 1, wherein the control value is a speed ratio of the continuously variable transmission.

3. The diagnostic apparatus for the belt squeezing force adjusting mechanism according to claim 1, wherein the control value is a sheave position of the primary sheave of the continuously variable transmission.

4. The diagnostic apparatus for the belt squeezing force adjusting mechanism according to claim 1, wherein the lower region is a region that is outside, to the lower side, of a control value range that can be reached when there is a malfunction in the belt squeezing force adjusting mechanism.

5. The diagnostic apparatus for the belt squeezing force adjusting mechanism according to claim 1, wherein the diagnostic device determines whether the actual control value and the target control value are within a far range, and a state in which the actual control value and the target control value continue to be within the far range for a predetermined period of time is the state in which the actual control value has difficulty coming close to the target control value.

6. The diagnostic apparatus for the belt squeezing force adjusting mechanism according to claim 1, wherein the determination that the belt squeezing force adjusting mechanism is functioning normally is made when the actual control value is able to come close to the target control value, and a state in which the input torque of the primary sheave is greater than a reference torque and the rotation speed of the primary sheave is greater than a reference rotation speed continues for a predetermined period of time.

7. The diagnostic apparatus for the belt squeezing force adjusting mechanism according to claim 1, wherein the diagnostic device determines whether the actual control value and the target control value are within a close range, and the state in which the actual control value and the target control value are within the close range is a state in which the actual control value is able to come close to the target control value.

8. The diagnostic apparatus for the belt squeezing force adjusting mechanism according to claim 1, wherein the lower region is a region that is lower than a value set within a range of the control value in which a speed ratio corresponds to a value between 1 and a minimum speed ratio, inclusive.

9. The diagnostic apparatus for the belt squeezing force adjusting mechanism according to claim 1, wherein the lower region is i) a region which is a minimum control value within a shift range of the continuously variable transmission, or ii) a region that includes that region and a value near the minimum control value.

10. The diagnostic apparatus for the belt squeezing force adjusting mechanism according to claim 1, wherein the precondition determining apparatus adds a condition that the rotation speed of the primary sheave and the rotation speed of the secondary sheave be in a high region, as an AND condition, to the condition that the target control value be in the low region as the precondition.

11. The diagnostic apparatus for the belt squeezing force adjusting mechanism according to claim 1, wherein a mechanism that adjusts the width of the groove of the primary sheave and the secondary sheave increases or decreases the width of the groove using a hydraulic cylinder by increasing the volume of the hydraulic cylinder by drawing in hydraulic fluid, and conversely decreasing or increasing the width of the groove by reducing the volume of the hydraulic cylinder by discharging hydraulic fluid, and shift control executes belt squeezing force control according to hydraulic pressure applied to the hydraulic cylinder of the primary sheave and the secondary sheave, as well as performs a process to adjust the control value according to the amount of hydraulic fluid supplied to or discharged from the hydraulic cylinder of the primary sheave.

12. A diagnostic method for a belt squeezing force adjusting mechanism of a continuously variable transmission in which a belt is wound around a primary sheave that receives driving force and a secondary sheave that outputs force to a drive-line, and which continuously changes the output rotation speed by adjusting the width of the groove of the primary sheave and the secondary sheave by shift control of controlling an actual control value responding to a target control value, characterized by comprising:

determining, as a precondition, whether a target control value calculated in shift control is in a lower region than a region of the control value that can be reached when the belt squeezing force adjusting mechanism is malfunctioning; and performing a diagnostic on the belt squeezing force adjusting mechanism based on the relationship between the actual control value and the target control value when the control value is reducing due to the shift control in a case that it is determined that the precondition is satisfied, when it is determined that the precondition satisfied, determining that there is a malfunction in the belt squeezing force adjusting mechanism when the actual control value has difficulty coming close to the target control value during the control to reduce the control value, and determining that the belt squeezing force adjusting mechanism is functioning normally when the actual control value is able to come close to the target control value.

13. The diagnostic method for a belt squeezing force adjusting mechanism according to claim 12, characterized in that the control value is a speed ratio of the continuously variable transmission.

14. The diagnostic method for a belt squeezing force adjusting mechanism according to claim 12, characterized in that the control value is a sheave position of the primary sheave of the continuously variable transmission.

* * * * *